United States Patent
Zemach et al.

(10) Patent No.: US 10,819,647 B2
(45) Date of Patent: Oct. 27, 2020

(54) NETWORK DEVICE HAVING REDUCED LATENCY

(71) Applicant: Marvell Israel (M.I.S.L) Ltd., Yokne'am (IL)

(72) Inventors: Rami Zemach, Givat Shapira (IL); Yaron Kittner, Pardes Hanna-Karkur (IL)

(73) Assignee: Marvell Israel (M.I.S.L) Ltd., Yokne'am (IL)

( * ) Notice: Subject to any disclaimer, the term of this patent is extended or adjusted under 35 U.S.C. 154(b) by 129 days.

(21) Appl. No.: 16/207,474

(22) Filed: Dec. 3, 2018

(65) Prior Publication Data

US 2019/0173769 A1    Jun. 6, 2019

Related U.S. Application Data

(60) Provisional application No. 62/595,446, filed on Dec. 6, 2017.

(51) Int. Cl.

| | |
|---|---|
| *H04L 12/26* | (2006.01) |
| *H04L 12/835* | (2013.01) |
| *H04L 12/841* | (2013.01) |
| *H04L 12/861* | (2013.01) |
| *H04L 12/863* | (2013.01) |
| *H04L 12/875* | (2013.01) |
| *H04L 12/925* | (2013.01) |
| *H04L 12/935* | (2013.01) |

(52) U.S. Cl.
CPC ........ *H04L 47/564* (2013.01); *H04L 43/0852* (2013.01); *H04L 47/30* (2013.01); *H04L 47/56* (2013.01); *H04L 47/6245* (2013.01); *H04L 49/3027* (2013.01); *H04L 49/90* (2013.01)

(58) Field of Classification Search
CPC ... H04L 47/564; H04L 47/56; H04L 49/3027; H04L 49/90; H04L 43/0852; H04L 47/30; H04L 47/6245; H04L 47/283; H04L 47/722

See application file for complete search history.

(56) References Cited

U.S. PATENT DOCUMENTS

| | | | |
|---|---|---|---|
| 2005/0024369 A1* | 2/2005 | Xie | H04N 5/44508 345/547 |
| 2009/0110110 A1* | 4/2009 | Kyusojin | H04L 49/90 375/295 |

(Continued)

*Primary Examiner* — Moo Jeong (57) ABSTRACT

A network device includes a transmit buffer from which data is transmitted to a network, and a packet buffer from which data chunks are transmitted to the transmit buffer in response to read requests. The packet buffer has a maximum read latency from receipt of a read request to transmission of a responsive data chunk, and receives read requests including a read request for a first data chunk of a network packet and a plurality of additional read requests for additional data chunks of the network packet. A latency timer monitors elapsed time from receipt of the first read request, and outputs a latency signal when the elapsed time reaches the first maximum read latency. Transmission logic waits until the elapsed time equals the first maximum read latency, and then transmits the first data chunk from the transmit buffer, without regard to a fill level of the transmit buffer.

24 Claims, 3 Drawing Sheets

(56) References Cited

U.S. PATENT DOCUMENTS

| | | | |
|---|---|---|---|
| 2009/0257441 A1* | 10/2009 | Hata | H04L 49/9047 370/412 |
| 2014/0240326 A1* | 8/2014 | Cutter | G06F 13/1626 345/502 |
| 2018/0176144 A1* | 6/2018 | Luo | H04L 47/56 |

* cited by examiner

NETWORK DEVICE HAVING REDUCED LATENCY

CROSS REFERENCE TO RELATED APPLICATION

This claims the benefit of commonly-assigned U.S. Provisional Patent Application No. 62/595,446, filed Dec. 6, 2017, which is hereby incorporated by reference herein in its entirety.

FIELD OF USE

This disclosure relates to a data switching device for use in a network. More particularly, this disclosure relates to a network data switching device having a write buffer/transmit FIFO which operates with reduced latency while avoiding underrun.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Network switching devices operate at high data rates and high bandwidths. In order to maintain communications between devices, it is important to avoid an "underrun" condition—i.e., a situation that typically occurs after transmission has started, where a transmitter (for, example, a port) has insufficient data for transmission—because an underrun condition may cause a remote device to assume erroneously that a session transmission is complete or that a connection has been broken, which could lead to the remote device erroneously terminating the session at its end. At the same time, it is desirable to utilize the capacity of the connection to the maximum extent possible—i.e., it is desirable to attempt to achieve "full wire speed."

SUMMARY

A network device, in accordance with implementations of the subject matter of the present disclosure, for connection to a communications network, includes a transmit buffer from which data is transmitted from the network device to the communications network, and a packet buffer from which chunks of data are transmitted to the transmit buffer in response to read requests. The packet buffer has a first maximum read latency from receipt of a respective read request to transmission of a respective data chunk responsive to the respective read request, and receives a first stream of read requests including a first read request for a first data chunk of a first network packet and a plurality of additional read requests for additional data chunks of the first network packet. The network device further includes a latency timer that monitors an amount of time that has elapsed from receipt of the first read request for a first data chunk of the first network packet, and outputs a latency signal when the amount of time that has elapsed reaches the first maximum read latency, and transmission logic configured to wait until the amount of time that has elapsed from receipt of the first read request for a first data chunk of the first network packet equals the first maximum read latency, and when the amount of time that has elapsed from receipt of the first read request for a first data chunk of the first network packet, transmit the first data chunk of the first network packet from the transmit buffer, without regard to a fill level of the transmit buffer.

A first implementation of such a network device further includes a latency counter that is incremented by the latency signal output by the latency timer. The transmission logic is configured to check the latency counter following the first request for the first data chunk of the first network packet, until a non-zero value is detected, signifying that the amount of time that has elapsed from receipt of the first read request for the first data chunk of the first network packet at least equals the first maximum read latency.

In a second implementation of such a network device, the first stream of read requests is received in a read order, and the network device further includes a transmission timer configured to measure a period of time that has elapsed from the transmitting of the first data chunk of the first network packet from the transmit buffer. The transmission logic is configured to, when the period of time that has elapsed from the transmitting of the first data chunk of the first network packet from the transmit buffer reaches any integer multiple of a predetermined interval that defines a desired data rate, transmit a next data chunk of the first network packet, according to the read order, without regard to the fill level of the transmit buffer.

In that second implementation, the data chunks of the first network packet arrive at the transmit buffer out of the read order, the data chunks of the first network packet are tagged with indications of ordinal position in the first network packet, and the transmit buffer includes a set of ordered locations for storing the data chunks of the first network packet according to the indications of ordinal position, prior to transmission from the transmit buffer.

In a third implementation of such a network device, the first maximum read latency is defined by a number of clock cycles between receipt of a respective read request to transmission of a respective data chunk responsive to the respective read request, and the latency timer includes a delay line having a number of sampling elements equal to the number of clock cycles defining the first maximum read latency.

In a first variant of that third implementation, the delay line includes a shift register.

A second variant of that third implementation further includes a latency counter coupled to a first output tap of the delay line. The transmission logic is configured to check the latency counter for a non-zero value to determine when the amount of time that has elapsed from receipt of the first read request for a first data chunk of the first network packet reaches the first maximum read latency.

In a fourth implementation of such a network device, the packet buffer receives at least one additional stream of read requests including a first read request for a first data chunk of an additional network packet and a plurality of additional read requests for additional data chunks of the additional network packet, the packet buffer has a respective additional maximum read latency for each respective additional stream of read requests; the latency timer further measures a respective additional amount of time that has elapsed time from each first read request for each first data chunk of each respective additional network packet, and the transmission logic is further configured to wait until the respective additional amount of time that has elapsed from the first read request for a first data chunk of each respective additional network packet equals the respective additional maximum read latency, and when the respective additional amount of time that has elapsed from the first read request for a first data chunk of a respective additional network packet equals the respective additional maximum read latency, transmit the first data chunk of the respective additional network packet from the transmit buffer, without regard to the fill level of the transmit buffer.

In a variant of that fourth implementation, each of the first maximum read latency and each respective additional maximum read latency is measured as a respective number of clock cycles, and the latency timer includes a delay line having a number of samples equal to a number of clock cycles in a longest one of the first maximum read latency and each respective additional maximum read latency, each respective one of the first maximum read latency and each respective additional maximum read latency corresponding to a respective tap of the delay line.

That variant further includes a respective latency counter coupled to each respective output tap of the delay line. The transmission logic is configured to check each respective latency counter for a non-zero value to determine that the respective additional amount of time that has elapsed from the first read request for a first data chunk of a respective network packet equals the respective maximum read latency.

A method of operating a network device coupled to a communications network, in accordance with implementations of the subject matter of the present disclosure, includes receiving at a packet buffer of the network device a stream of read requests to read data of network packets from the packet buffer of the network device. The read requests include a first read request to read a first data chunk of a first network packet and a plurality of subsequent read requests to read subsequent data chunks of the first network packet, each of the first request and the plurality of subsequent read requests causing a respective data chunk to be communicated from the packet buffer to a transmit buffer. The packet buffer has a maximum read latency indicative of an amount of time required, following one of the first read request or any one of the subsequent read requests, to return a data chunk from the packet buffer. The method further includes monitoring an amount of time that has elapsed from receipt of the first read request for a first data chunk of the first network packet, and when the amount of time that has elapsed from receipt of the first read request for a first data chunk of a first network packet equals the maximum read latency, transmitting the first data chunk of the first network packet from the transmit buffer, without regard to a fill level of the transmit buffer.

In a first implementation of such a method, the measuring the amount of time that has elapsed, from receipt of the first read request for a first data chunk of the first network packet includes providing a delay line having a delay equal to the maximum read latency, injecting a signal into the delay line upon the receipt of the first read request for a first data chunk of the first network packet, monitoring an output of the delay line for the signal, incrementing a counter from '0' to a non-zero value upon detection of the signal at the output of the delay line, and checking whether the counter contains a non-zero value.

In a second implementation of such a method, the stream of read requests is received in a read order, and the method further includes monitoring a period of time that has elapsed from commencement of transmission of the first data chunk of the first network packet from the transmit buffer, and when the period of time that has elapsed from commencement of transmission of the first data chunk of the first network packet from the transmit buffer reaches any integer multiple of a predetermined time interval, defining a desired data rate, following the commencement of transmission of the first data chunk of the first network packet from the transmit buffer, transmitting one of the subsequent data chunks of the first network packet according to the read order, without regard to the fill level of the transmit buffer.

A variant of that implementation further includes, for data chunks that arrive at the transmit buffer out of the read order, reordering the data chunks prior to transmission from the transmit buffer, and transmitting the reordered data chunks from the transmit buffer in the read order. In that variant, the data chunks may be tagged with indications of ordinal position within the network packet, and the reordering may include storing the tagged data chunks, according to the indications of ordinal position within the network packet, in ordered locations in the transmit buffer.

In a third implementation of such a method, where there are a plurality of respective additional streams of respective additional read requests corresponding to a plurality of respective network packets, each respective additional stream of read requests including a respective additional first request for a respective additional first data chunk of each respective additional network packet and respective additional subsequent requests for respective additional subsequent data chunks of each respective additional network packet from the packet buffer, each respective additional stream of respective additional read requests being received in a respective read order for its respective additional network packet, the packet buffer having a respective maximum read latency for each respective additional stream of respective additional read requests, the method further includes monitoring a respective additional amount of time that has elapsed from receipt of each respective additional read request, in a respective additional stream of respective additional read requests, for a respective additional first data chunk of each respective additional network packet other than the first network, and when the respective additional amount of time that has elapsed from receipt of the respective additional first read request for a respective additional first data chunk of a respective additional network packet other than the first network packet equals the respective additional maximum read latency for the respective additional stream of respective additional read requests, transmitting the respective additional first data chunk of the respective additional network packet from the transmit buffer.

In a first variant of the third implementation, the monitoring the amount of time that has elapsed from receipt of the first read request for a first data chunk of the first network packet, and the monitoring the respective additional amount of time that has elapsed from receipt of each respective additional read request, in a respective additional stream of respective additional read requests, for a respective additional first data chunk of each respective additional network packet other than the first network packet, include providing a delay line having respective delays equal to each respective maximum read latency, injecting a respective signal into the delay line upon the receipt of a respective first read request for a respective first data chunk of a respective first network packet, monitoring a respective output of the delay line for the respective signal, incrementing a respective counter from '0' to a non-zero value upon detection of the respective signal at the respective output of the delay line, and checking whether a respective counter contains a non-zero value.

A second variant of the third implementation further includes monitoring a respective period of time that has elapsed from respective commencement of transmission of the first data chunk of each respective network packet from the transmit buffer, and upon elapsing of each integer multiple of a respective predetermined time interval, defining a desired data rate, following the respective commencement of the first data chunk of each respective network packet from the transmit buffer, transmitting a respective subsequent data chunk of the respective network packet, without regard to the fill level of the transmit buffer.

The second variant of the third implementation may further include, for data chunks of a respective network packet having a read order, that arrive at the transmit buffer out of the read order, reordering the data chunks of the respective network packet prior to transmission from the transmit buffer, and transmitting the reordered data chunks of the respective network packet from the transmit buffer in the read order.

In the second variant of the third implementation the data chunks of the respective network packet may be tagged with respective indications of ordinal position within the respective network packet, and the reordering may include storing the tagged data chunks of the respective network packet, according to the respective indications of ordinal position within the respective network packet, in a respective set of ordered locations in the transmit buffer.

Another method of operating a network device coupled to a communications network, in accordance with implementations of the subject matter of the present disclosure, includes receiving at a packet buffer of the network device a stream of read requests to read data of a network packet from the packet buffer of the network device, the read requests including a first read request to read a first data chunk of the network packet and a plurality of subsequent read requests to read additional data chunks of the network packet, each of the first request and the plurality of subsequent read requests causing a respective data chunk to be communicated from the packet buffer to a transmit buffer. The method also includes transmitting the first data chunk of the network packet from the transmit buffer without regard to a fill level of the transmit buffer, and transmitting subsequent data chunks of the network packet at multiples of a predetermined time interval, defining a desired data rate, following commencement of the transmitting of the first data chunk of the network packet.

In a first implementation of such a method, the packet buffer has a maximum read latency indicative of an amount of time required, following one of the first read request or any one of the additional read requests, to return a data chunk from the packet buffer, and the transmitting the first data chunk of the network packet from the transmit buffer without regard to the fill level of the transmit buffer includes monitoring an amount of time that has elapsed from receipt of the first read request for the first data chunk of the network packet, and when the amount of time that has elapsed from receipt of the first read request for the first data chunk of the network packet equals the maximum read latency, transmitting the first data chunk of the network packet from the transmit buffer.

In that first implementation, the monitoring the amount of time that has elapsed from receipt of the first read request for a first data chunk of the network packet includes providing a delay line having a delay equal to the maximum read latency, injecting a signal into the delay line upon the receipt of the first read request for a first data chunk of the network packet, monitoring an output of the delay line for the signal, incrementing a counter from '0' to a non-zero value upon detection of the signal at the output of the delay line, and checking whether the counter contains a non-zero value.

A second implementation of such a method further includes, for data chunks of the network packet having a read order, that arrive at the transmit buffer out of the read order, reordering the data chunks of the network packet prior to transmission from the transmit buffer, and transmitting the reordered data chunks of the network packet from the transmit buffer in the read order.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

In order to ensure, probabilistically, that underrun can be avoided while approaching full wire speed, implementations of the subject matter of this disclosure provide a network switching device that reduces latency by determining when to begin a transmission based on the amount of time that has elapsed time following the request that leads to the transmission, rather than determining when to begin based on the amount of data accumulated in a transmit buffer following the request that triggers the transmission.

A transmit buffer receives data, from a packet buffer, typically in response to read requests, for transmission out of the switching device through a corresponding port. In implementations of the subject matter of the present disclosure, the packet buffer is a "probabilistic" memory—meaning that the read response latency of the packet buffer is not constant, but the packet buffer is designed to guarantee a response within a maximum latency interval, whose probability of being exceeded is below a predetermined value (e.g., once every 10 years). The maximum latency interval of the packet memory may also depend on specific characteristics of the packets—e.g., packet size, type of packet, etc.

Ports of the switching device operate at a certain data rate, meaning that once a flow of data to a port has been initiated, the port expects to receive data at that rate, and if the port does not receive data at that rate, underrun may occur. For example, the port may expect to receive a portion of data at a predetermined interval. For this purpose, the portion can be a "cell" of a defined size (e.g., determined by bus width) or a more generic "chunk" of data. In one example, if the data rate of the port is such that the port expects a chunk or cell of data every five clock cycles, then once data begins to flow toward the port, the second chunk or cell must arrive within five clock cycles of the arrival of the first chunk or cell, the third chunk or cell must arrive within ten clock cycles of the arrival of the first chunk or cell, etc. Whenever this requirement is violated, underrun may occur, possibly resulting in a fatal packet error.

In an extreme example, during completely "normal" operation, a first data chunk or cell may arrive with no or minimal latency, while a second data chunk or cell may arrive with the maximum latency, with the result that the two data chunks or cells are separated by nearly twice the maximum latency. Even at lesser extremes of normal operation, two chunks or cells of a network packet can be separated by more than the maximum latency. To prevent underrun, the transmit buffer buffers some number of chunks or cells of a network packet before beginning transmission of any chunks of the network packet, so that it can release chunks or cells for transmission at predetermined intervals based on the desired data rate.

In previously-known implementations, a transmit buffer would accumulate a certain number of chunks or cells of a network packet, and transmission of chunks or cells of the network packet would only commence once a minimal fill level threshold of the buffer was met. A fill level threshold, N, of chunks or cells depended on the maximum latency interval of the packet buffer, the width of the interface, the clock frequency of the system, and the port speed, as expressed in the following equation:

$$N = PB\_MAX\_Latency\_in\_cc / ((width\_of\_interface \times clock\_freq) / (port\_speed))$$

where:
PB_MAX_Latency_in_cc is the maximum latency interval of the packet buffer in normal operation, measured in number of clock cycles;
width_of_interface is the width of the interface in bytes;
clock_freq is the clock frequency of the system, measured in MHz; and
port_speed is the speed of the port to which the data is transferred by the transmit buffer, measured in GHz.

But to maintain throughput at the desired rate, the transmit buffer needs to be able to store not only the number of data chunks or cells to be buffered before transmission begins, but also that same number of data chunks or cells again, representing the amount of data in transit from the transmit buffer to the port. Therefore, the buffer size N' of the transmit buffer in such known implementations could be expressed as:

$$N' = 2 \times PB\_MAX\_Latency\_in\_cc / ((width\_of\_interface \times clock\_freq) / (port\_speed))$$

However, in accordance with implementations of the subject matter of the present disclosure, it is not necessary to accumulate a specific quantity of data before beginning to transmit, beyond the amount of data needed to account for data in transit, as long as the maximum latency interval has passed from the time a request was issued for the first data chunk or cell to be transmitted. Because if the packet buffer is operating properly, it will send the first data chunk or cell responsive to the request within the maximum latency interval following the request, and will send each subsequent chunk or cell within each maximum latency interval following subsequent requests. Therefore, in implementations of the subject matter of the present disclosure, irrespective of an actual fill level of the transmit buffer, which may be affected for instance by a transmit rate of packets that were previously stored in the buffer, it is sufficient to wait for the maximum latency interval to elapse following a request to transmit an initial or first chunk or cell of a network packet from the transmit buffer to the port, and to then wait for a predetermined transmission interval, based on the data rate of the port, to elapse following transmission of each data chunk or cell, before transmitting the next data chunk or cell.

As noted, the packet buffer, if operating properly, guarantees that any data chunk or cell that is requested will arrive from the packet buffer (which may be referred to as a first buffer) to the transmit buffer (which may be referred to as a second buffer), within the maximum latency interval following a request for that data chunk or cell. To maintain the data rate of the port, data chunks or cells must be transmitted from the transmit buffer to the port at some predetermined transmission interval, based on that data rate, which may be different from the rate at which data chunks or cells are supplied from the packet buffer. Because each data chunk or cell, when requested from the packet buffer, may not arrive until the full maximum latency interval has elapsed, in implementations of the subject matter of the present disclosure, data chunks or cells are requested from the packet buffer—e.g., by a packet processor within the transmit direct memory access (TXDMA) circuitry of the network switching device—no less often than once every predetermined transmission interval (which is based on the data rate as noted above).

At one extreme, if every respective data chunk or cell were to arrive exactly at the maximum latency interval following the respective request for that respective data chunk or cell, and the requests were spaced apart by the predetermined transmission interval, then no data would be stored in the transmit buffer. Rather, each data chunk or cell would arrive just as it was needed, and would immediately be transmitted out of the transmit buffer.

At another extreme, each data chunk or cell could arrive nearly as soon as it was requested, meaning that a relatively large number (determined by the maximum latency interval and the predetermined transmission interval) of data chunks or cells would have to be stored. For example, if the maximum latency interval is 100 clock cycles, and the predetermined transmission interval is 5 clock cycles, and if requests for data chunks or cells are issued every 5 clock cycles, then during the maximum latency interval following the request for the first data chunk or cell, before any data chunks or cells have been transmitted out by the transmit buffer, 20 data chunks or cells could arrive at the transmit buffer and require storage, if each data chunk or cell is returned, on average, no later than 5 clock cycles after being requested.

And if requests for data chunks or cells are issued more frequently—i.e., are spaced apart by less than the predetermined transmission interval—then even more data could accumulate in the transmit buffer.

However, the amount of data to be stored still is less than the amount stored by the previously known implementation that would not transmit any data until it had accumulated the amount of data that would be transmitted, at the predetermined data rate, during a complete maximum latency interval. The amount of data stored in implementations according to the present disclosure is reduced by starting transmission based not on how much data has been accumulated in the transmit buffer, but rather on how much time has elapsed since the request for the first data chunk or cell of a network packet.

Therefore, implementations of a transmit buffer in a memory module according to the subject matter of the present disclosure include a timer or timing mechanism to determine whether the maximum latency interval of the packet buffer has passed. In implementations where the maximum latency interval is measured as, or can be converted to, a number of clock cycles, the timer may be a simple delay line having a number of samples equal to that number of clock cycles. If a signal is injected into the delay line when the request for the first data chunk or cell of a packet (i.e., the "start of packet" or "SOP" data chunk or cell) is issued, the signal will be clocked through the delay line, one sample per clock cycle, and will emerge at the output of the delay line at the end of the maximum latency interval. The signal could be the request itself, or an initial portion of the request, or a separate signal generated in response to the request.

When the signal emerges from the output of the delay line, transmission logic in the memory module begins to transmit data from the transmit buffer to the output port. The transmission logic may determine that the signal has been output by the delay line, signaling the passage of the maximum latency interval, by examining a flag that may be set by the signal once it has been output by the delay line. For example, in an implementation of the subject matter of the present disclosure, the output of the signal from the delay line increments a counter, which can be examined by the transmission logic; if the counter contains a non-zero value, the flag is "set" and transmission of chunks or cells of the current network packet may begin. Upon beginning transmission, the transmission logic may decrement the counter, resetting the flag for the start of the next packet.

Monitoring of the maximum latency interval occurs only for the first (i.e., "start of packet" or "SOP") chunk of a packet. Therefore, there is no reason to expect that the counter would ever contain a value other than '0' or '1'. Accordingly, it is not necessary to use a counter as the flag. Any other type of device that can be set as desired to '0' or '1' can be used as the flag. In such a case, the references above to "incrementing" and "decrementing" a counter may be considered more generally as "setting" and "resetting" (or "clearing") a flag.

In such implementations, at no time is the amount of data currently stored in the transmit buffer relevant to how long the transmission logic will wait to begin transmitting data chunks or cells out of the network device. Data is transmitted from the transmit buffer based on the maximum latency interval having elapsed, without regard to the fill level of the transmit buffer.

As noted above, in implementations of the subject matter of the present disclosure the packet buffer is "probabilistic," sending different requested data chunks or cells after different delays, as long as each delay is no longer than the maximum latency interval. Therefore, it is possible that data chunks or cells will arrive at the transmit buffer out of order. In the example above, where the maximum latency interval is 100 clock cycles and the predetermined transmission interval is 5 clock cycles, with each request to the packet buffer for a data chunk or cell issued every 5 clock cycles, the third data chunk or cell, requested 10 clock cycles after the first data chunk or cell was requested, may arrive with a latency of 45 clock cycles—i.e., 55 clock cycles after the first data chunk was requested, while the seventh data chunk or cell, requested 30 clock cycles after the first data chunk or cell was requested, may arrive with a latency of 12 clock cycles—i.e., 42 clock cycles after the first data chunk or cell was requested, which is 13 clock cycles before the third data chunk or cell arrives. This is only an example; other combinations of latencies can affect other data chunks or cells to cause those other data chunks or cells to be out of order.

Accordingly, a reordering mechanism may be provided to ensure that chunks or cells of data are transmitted from the packet buffer according to their predetermined order in a network packet. In some implementations, the data chunks or cells are supplied by the packet buffer to the transmit buffer with tags specifying their ordinal locations, and the transmit buffer includes ordered storage locations with addresses corresponding to the tags. As each data chunk or cell arrives at the transmit buffer from the packet buffer, it is stored into the appropriate storage location based on its tag, and the data chunks or cells are then read out of the transmit buffer in order at the time of transmission.

In some implementations of the subject matter of the present disclosure, the memory module processes a plurality of packet flows in parallel. That is, at any one time, the packet buffer could be receiving requests for data chunks or cells of different network packets, and the transmit buffer would then be accumulating and transmitting different flows of data chunks or cells representing different network packets. Therefore, the transmit buffer may have different sets of the aforementioned ordered storage locations, so that it can accumulate and reorder data chunks or cells for different packets.

In addition, the respective requests for the first chunks or cells of the different network packets normally would not be expected to arrive at the same times. Moreover, the maximum latency interval of the packet buffer may differ for different types of data (e.g., the maximum latency interval for multi-case packets may differ from the maximum latency interval for unicast packets), or for packets of different sizes. Chunks or cells of the different types of packets with the differing maximum latency intervals may be accumulated in different queues in the same transmit buffer, or in separate transmit buffers. Either way, a memory module of a network device according to implementations of the present disclosure may need to accommodate different maximum latency intervals for different packets that are being accumulated in the transmit buffer.

This requirement may be accommodated by providing a plurality of timers (e.g., a plurality of delay lines), equal in number to the maximum number of channels (i.e., the maximum number of different network packets that can be accumulated at one time in the transmit buffer). Alternatively, this requirement may be accommodated by a single delay line, where the signal propagated through the delay line identifies the channel to which it applies. As the signal is output from the delay line, its channel identification is examined and it is routed to the counter or flag for the channel to which it applies to increment or set the counter or flag. Different maximum latency intervals for different channels can be accommodated by tapping the delay line at different points. The shorter maximum latency intervals will be tapped off earlier. Although the signals for all of the maximum latency intervals will be output at all of the taps, the channel identification in each signal will cause any signal intended for one tap to be ignored at each other tap.

Figure 1:
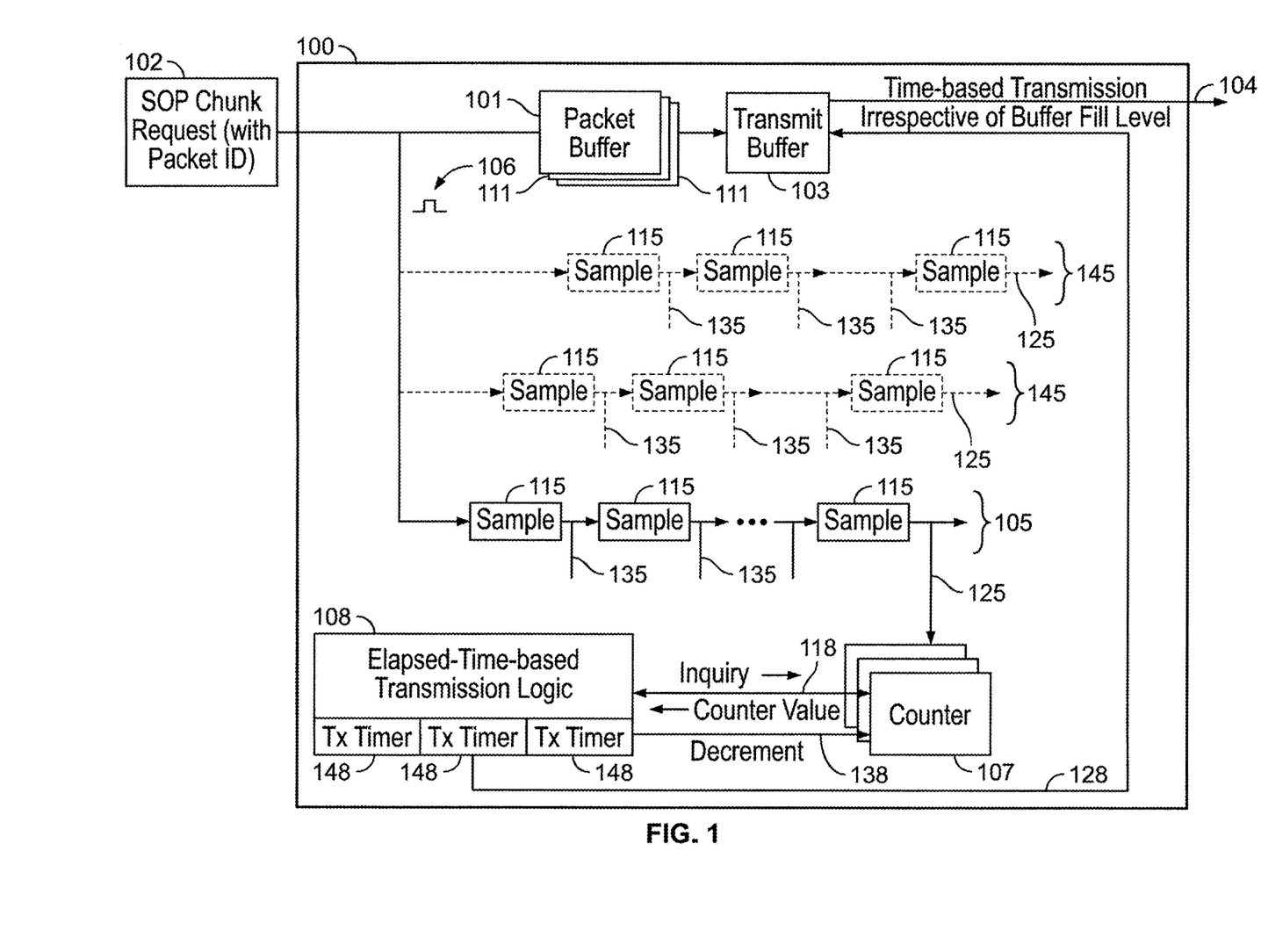
FIG. 1 is a representation of a portion of a network switching device in accordance with implementations of the subject matter of this disclosure.

FIG. 1 shows the Transmit, or Egress, portion of a network switching device 100 incorporating of the subject matter of this disclosure. Network switching device 100 includes at least one packet buffer 101 which receives, from elsewhere (not shown) in network switching device 100, packets to be transmitted out of network switching device 100. In implementations of the subject matter of the present disclosure, packet buffer 101 stores packets that are received from a computer network while the packets (or data units representing the packets) are processed by a packet processor (not shown). Packet buffer 101 may be a single storage device capable of operating with different maximum latency intervals for different types of packets, or may be a plurality of storage devices 111, each of which operates at separate maximum latency interval. In response to requests received at 102, packet buffer 101 returns chunks or cells of network packets to transmit buffer 103, for transmission at 104 out of network switching device 100.

At least one delay line 105 is provided as a timer, as described above. Delay line 105 includes a number of sample registers 115 equal to the number of clock cycles of delay in the maximum latency interval (expressed in clock cycles) to be monitored. When the request at 102 is for an SOP ("start of packet") data chunk or cell of any network packet, then when the request is sent to packet buffer 101, a pulse 106 is sent down delay line 105 from the source of the request. Pulse 106 will advance down delay line 105, advancing from one sample register 115 to the next on each clock cycle. After a number of clock cycles equal to the maximum latency interval (expressed in clock cycles) to be monitored, pulse 106 will have advanced to the end of delay line 105, where it can be detected by counter 107 or other flag device (not shown). Because the maximum latency interval is to be measured from the time a request reaches packet buffer 101, the circuit path from the source of the request to the first sample register 115 should be at least as long as the circuit path from the source of the request to packet buffer 101, to prevent pulse 106 from reaching the end of delay line 105 sooner than the end of the maximum latency interval.

When transmission logic 108 is otherwise ready to initiate transmission of a data chunk or cell of a network patent out of transmit buffer 103, transmission logic 108 makes an inquiry 118 of counter 107, receiving back the value in counter 107. If the value received from counter 107 is non-zero, transmission logic 108 instructs transmit buffer 103 at signal 128 to transmit the chunks or cells of the appropriate network packet. Transmission logic 108 then issues a decrement command 138 to cause counter 107 to be reset.

In some implementations, there may be situations in which multiple packets are processed concurrently. If the chunks or cells of all of the packets have the same maximum latency interval, then the same delay line (or other timer) 105 can be used for all chunks or cells. A packet identifier would be attached to or included in each pulse 106. When pulse 106 emerges from delay line 105 at final tap 125, transmission logic 108 reads the packet identifier from pulse 106 and initiates transmission by transmit buffer 103 of a chunk or cell of the packet identified by that packet identifier.

Even if the chunks or cells of different packets have different maximum latency intervals, it is still possible to use the same delay line 105. Delay line 105 would have a number of sample registers 115 at least equal to the longest maximum latency interval to be monitored. Pulses 106 having packet identifiers identifying data chunks or cells associated with packets having that longest maximum latency interval would be detected at tap 125. Other taps 135 (two are shown, but there can be any number up to the number of sample registers 115) would be used for shorter maximum delay intervals. Although each pulse 106 would travel all the way through delay line 105, and be detected at all taps 125, 135, the packet identifier of each pulse would ensure that each pulse triggers transmission of a chunk or cell of only the correct packet.

Alternatively, a plurality of delay lines 105, 145 of different lengths can be provided to accommodate different maximum latency intervals, with each delay line 105, 145 being monitored only at its respective final tap 125.

In some implementations, delay lines 105, 145 are implemented using standard shift registers.

As noted above, in some implementations, because of the probabilistic nature of the operation of packet buffer 101, data chunks or cells of any particular packet arrive at transmit buffer 103 out of order. In some implementations, in order for the data chunks or cells of a network packet to be transmitted out of transmit buffer 103 in the correct order to reconstruct the corresponding network packet, each chunk or cell arrives from packet buffer 103 with an associated tag number identifying the ordinal position of that data chunk or cell in its corresponding network packet. In such implementations, transmit buffer 103 includes memory locations allocated for each tag number. The data chunks or cells are transmitted from transmit buffer 103 in tag number order to reconstruct the tags.

Figure 2:
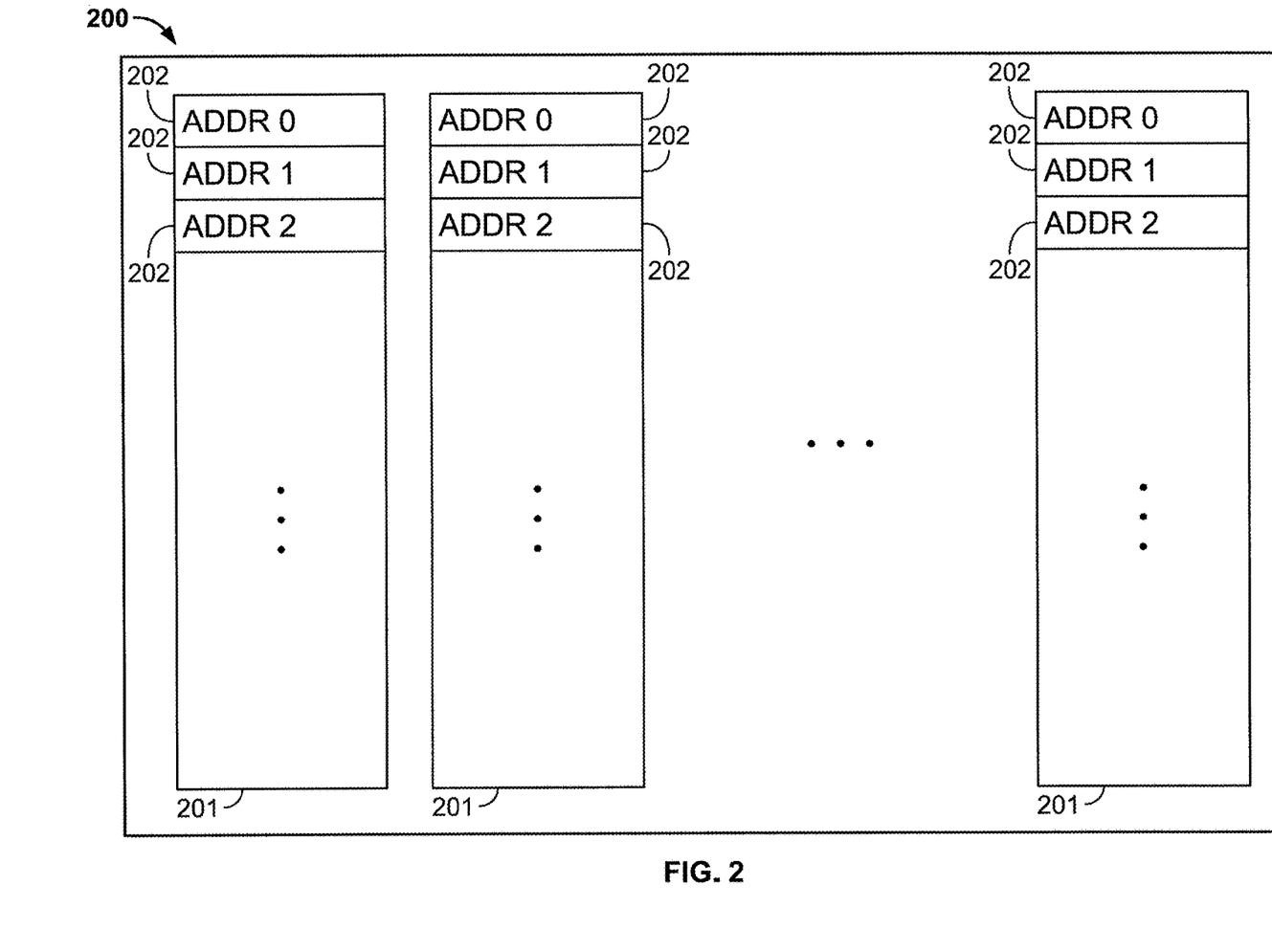
FIG. 2 is a representation of an implementation of a transmit buffer in the network switching device of FIG. 1.

FIG. 2 shows an implementation 200 of transmit buffer 103 including a plurality of memory modules 201 each of which has a plurality of memory slots 202 with addresses arranged in order. Alternatively, although each data chunk or cell is stored in transmit buffer 103 at an address allocated according to its tag number, the memory slots allocated to those tag numbers need not be physically in order. Transmission logic 108 nevertheless accesses the data chunks for transmission in tag number order to ensure transmission of the data chunks in the correct order.

As noted above, once the first data chunk of a particular packet is transmitted, each subsequent chunk must be transmitted within predetermined transmission interval to prevent underrun. Therefore, in an implementation, transmission logic 108 has a plurality of transmission interval timers 148 for timing the transmission intervals between chunks of the respective packets. In some implementations of the subject matter of the present disclosure, the number of transmission interval timers 148 determines the number of packets that can be processed at any one time.

Figure 3:
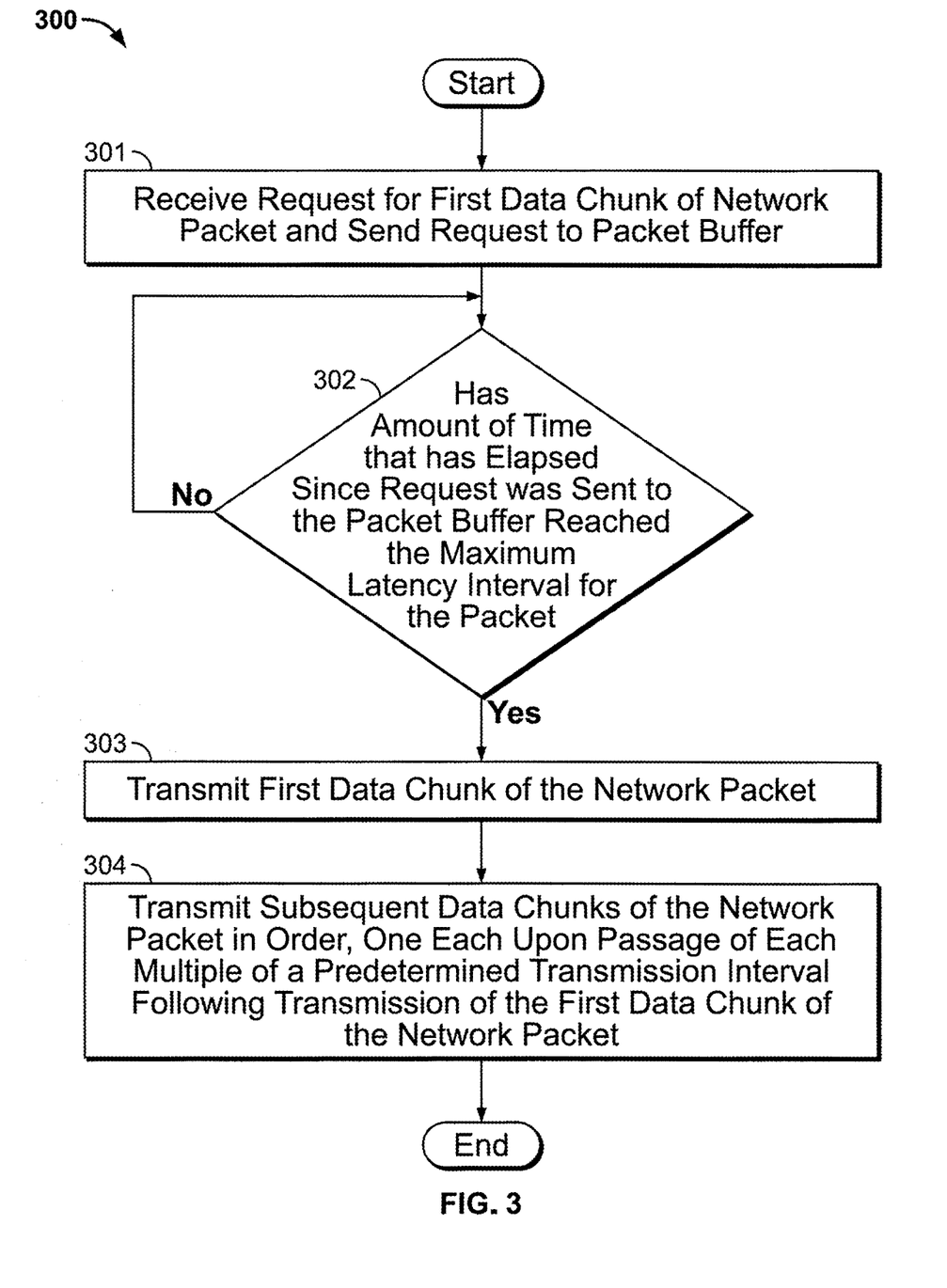
FIG. 3 is a flow diagram of a method of operating a network switching device in accordance with implementations of the subject matter of this disclosure.

An implementation of a method 300 of operating a network device as described above is diagrammed in FIG. 3. At 301, a request for a first data chunk or cell of a network packet is received and then sent to a packet buffer. At 302, the amount of time that has elapsed since the request was sent to the packet buffer is monitored to see if it has reached the maximum latency interval for the packet. At 303, when the amount of time that has elapsed since the request was sent to the packet buffer has reached the maximum latency interval for the packet, the first data chunk or cell of the network packet is transmitted out of the network device, and a transmission interval timer is started. At 304, subsequent data chunks or cells are transmitted in order, one each upon passage of each multiple of a predetermined transmission interval following transmission of the first data chunk or cell of the network packet, and method 300 ends.

Thus it is seen that a network switching device that reduces latency by determining when to begin a transmission based on the amount of time that has elapsed time following the request that leads to the transmission, rather than on the amount of data accumulated following the request that leads to the transmission, has been provided.

As used herein and in the claims which follow, the construction "one of A and B" shall mean "A or B."

It is noted that the foregoing is only illustrative of the principles of the invention, and that the invention can be practiced by other than the described implementations, which are presented for purposes of illustration and not of limitation, and the present invention is limited only by the claims which follow.

What is claimed is:

1. A network device for connection to a communications network, the network device comprising:
   a transmit buffer from which data is transmitted from the network device to the communications network;

a packet buffer from which chunks of data are transmitted to the transmit buffer in response to read requests, the packet buffer having a first maximum read latency from receipt of a respective read request to transmission of a respective data chunk responsive to the respective read request, and the packet buffer receiving a first stream of read requests including a first read request for a first data chunk of a first network packet and a plurality of additional read requests for additional data chunks of the first network packet;

a latency timer that monitors an amount of time that has elapsed from receipt of the first read request for the first data chunk of the first network packet, and outputs a latency signal when the amount of time that has elapsed reaches the first maximum read latency; and transmission logic configured to:

wait until the amount of time that has elapsed from receipt of the first read request for the first data chunk of the first network packet equals the first maximum read latency; and when the amount of time that has elapsed from receipt of the first read request for the first data chunk of the first network packet, transmit the first data chunk of the first network packet from the transmit buffer, without regard to satisfaction of a fill level threshold by a number of one or more data chunks that are present in the transmit buffer.

2. The network device of claim 1 further comprising a latency counter that is incremented by the latency signal output by the latency timer; wherein:

the transmission logic is configured to check the latency counter following the first request for the first data chunk of the first network packet, until a non-zero value is detected, signifying that the amount of time that has elapsed from receipt of the first read request for the first data chunk of the first network packet at least equals the first maximum read latency.

3. The network device of claim 1 wherein the first stream of read requests is received in a read order, the network device further comprising a transmission timer configured to measure a period of time that has elapsed from the transmitting of the first data chunk of the first network packet from the transmit buffer; wherein:

the transmission logic is configured to, when the period of time that has elapsed from the transmitting of the first data chunk of the first network packet from the transmit buffer reaches any integer multiple of a predetermined interval that defines a desired data rate, transmit a next data chunk of the first network packet, according to the read order, without regard to the satisfaction of the fill level threshold by the number of one or more data chunks that are present in the transmit buffer.

4. The network device of claim 3 wherein:

the data chunks of the first network packet arrive at the transmit buffer out of the read order, the data chunks of the first network packet being tagged with indications of ordinal position in the first network packet; and the transmit buffer comprises a set of ordered locations for storing the data chunks of the first network packet according to the indications of ordinal position, prior to transmission from the transmit buffer.

5. The network device of claim 1 wherein:

the first maximum read latency is defined by a number of clock cycles between receipt of a respective read request to transmission of a respective data chunk responsive to the respective read request; and the latency timer comprises a delay line having a number of sampling elements equal to the number of clock cycles defining the first maximum read latency.

6. The network device of claim 5, wherein the delay line comprises a shift register.

7. The network device of claim 5, further comprising a latency counter coupled to a first output tap of the delay line; wherein:

the transmission logic is configured to check the latency counter for a non-zero value to determine when the amount of time that has elapsed from receipt of the first read request for a first data chunk of the first network packet reaches the first maximum read latency.

8. The network device of claim 1 wherein:

the packet buffer receives at least one additional stream of read requests including a first read request for a first data chunk of an additional network packet and a plurality of additional read requests for additional data chunks of the additional network packet;

the packet buffer has a respective additional maximum read latency for each respective additional stream of read requests;

the latency timer further measures a respective additional amount of time that has elapsed time from each first read request for each respective first data chunk of each respective additional network packet; and the transmission logic is further configured to:

wait until the respective additional amount of time that has elapsed from the first read request for the respective first data chunk of each respective additional network packet equals the respective additional maximum read latency, and when the respective additional amount of time that has elapsed from the first read request for the respective first data chunk of each respective additional network packet equals the respective additional maximum read latency, transmit the first data chunk of the respective additional network packet from the transmit buffer, without regard to the satisfaction of the fill level threshold by the number of one or more data chunks that are present in the transmit buffer.

9. The network device of claim 8 wherein:

each of the first maximum read latency and each respective additional maximum read latency is measured as a respective number of clock cycles; and the latency timer comprises a delay line having a number of samples equal to a number of clock cycles in a longest one of the first maximum read latency and each respective additional maximum read latency, each respective one of the first maximum read latency and each respective additional maximum read latency corresponding to a respective tap of the delay line.

10. The network device of claim 9 further comprising a respective latency counter coupled to each respective output tap of the delay line; wherein:

the transmission logic is configured to check each respective latency counter for a non-zero value to determine that the respective additional amount of time that has elapsed from the first read request for a first data chunk of a respective network packet equals the respective maximum read latency.

11. A method of operating a network device coupled to a communications network, the method comprising:

receiving at a packet buffer of the network device a stream of read requests to read data of network packets from the packet buffer of the network device, the read requests including a first read request to read a first data chunk of a first network packet and a plurality of subsequent read requests to read subsequent data chunks of the first network packet, each of the first request and the plurality of subsequent read requests causing a respective data chunk to be communicated from the packet buffer to a transmit buffer, the packet buffer having a maximum read latency indicative of an amount of time required, following one of the first read request or any one of the subsequent read requests, to return a data chunk from the packet buffer;

monitoring an amount of time that has elapsed from receipt of the first read request for the first data chunk of the first network packet; and when the amount of time that has elapsed from receipt of the first read request for the first data chunk of the first network packet equals the maximum read latency, transmitting the first data chunk of the first network packet from the transmit buffer, without regard to satisfaction of a fill level threshold by a number of one or more data chunks that are present in the transmit buffer.

12. The method of claim 11, wherein the measuring the amount of time that has elapsed, from receipt of the first read request for the first data chunk of the first network packet comprises:

providing a delay line having a delay equal to the maximum read latency;

injecting a signal into the delay line upon the receipt of the first read request for the first data chunk of the first network packet;

monitoring an output of the delay line for the signal;

incrementing a counter from '0' to a non-zero value upon detection of the signal at the output of the delay line; and checking whether the counter contains a nonzero value.

13. The method of claim 11 wherein the stream of read requests is received in a read order, the method further comprising:

monitoring a period of time that has elapsed from commencement of transmission of the first data chunk of the first network packet from the transmit buffer; and when the period of time that has elapsed from commencement of transmission of the first data chunk of the first network packet from the transmit buffer reaches any integer multiple of a predetermined time interval, defining a desired data rate, following the commencement of transmission of the first data chunk of the first network packet from the transmit buffer, transmitting one of the subsequent data chunks of the first network packet according to the read order, without regard to the satisfaction of the fill level threshold by the number of one or more data chunks that are present in the transmit buffer.

14. The method of claim 13 further comprising, for data chunks that arrive at the transmit buffer out of the read order:

reordering the data chunks prior to transmission from the transmit buffer; and transmitting the reordered data chunks from the transmit buffer in the read order.

15. The method of claim 14 wherein:

the data chunks are tagged with indications of ordinal position within the network packet; and the reordering comprises storing the tagged data chunks, according to the indications of ordinal position within the network packet, in ordered locations in the transmit buffer.

16. The method of claim 11 wherein:

there are a plurality of respective additional streams of respective additional read requests corresponding to a plurality of respective network packets, each respective additional stream of read requests comprising a respective additional first request for a respective additional first data chunk of each respective additional network packet and respective additional subsequent requests for respective additional subsequent data chunks of each respective additional network packet from the packet buffer, each respective additional stream of respective additional read requests being received in a respective read order for its respective additional network packet, the packet buffer having a respective maximum read latency for each respective additional stream of respective additional read requests; the method further comprising:

monitoring a respective additional amount of time that has elapsed from receipt of each respective additional read request, in a respective additional stream of respective additional read requests, for each respective additional first data chunk of each respective additional network packet other than the first network; and when the respective additional amount of time that has elapsed from receipt of the respective additional first read request for the respective additional first data chunk of each respective additional network packet other than the first network packet equals the respective additional maximum read latency for the respective additional stream of respective additional read requests, transmitting the respective additional first data chunk of the respective additional network packet from the transmit buffer.

17. The method of claim 16 wherein monitoring the amount of time that has elapsed from receipt of the first read request for the first data chunk of the first network packet, and the monitoring the respective additional amount of time that has elapsed from receipt of each respective additional read request, in one of the respective additional streams of respective additional read requests, for a respective additional first data chunk of each respective additional network packet other than the first network packet, comprise:

providing a delay line having respective delays equal to each respective maximum read latency;

injecting a respective signal into the delay line upon the receipt of a respective first read request for a respective first data chunk of a respective first network packet;

monitoring a respective output of the delay line for the respective signal;

incrementing a respective counter from '0' to a non-zero value upon detection of the respective signal at the respective output of the delay line; and checking whether a respective counter contains a non-zero value.

18. The method of claim 16 further comprising:

monitoring a respective period of time that has elapsed from respective commencement of transmission of the first data chunk of each respective network packet from the transmit buffer; and upon elapsing of each integer multiple of a respective predetermined time interval, defining a desired data rate, following the respective commencement of the transmission of the first data chunk of each respective network packet from the transmit buffer, transmitting a respective subsequent data chunk of the respective network packet, without regard to the satisfaction of the fill level threshold by the number of one or more data chunks that are present in the transmit buffer.

19. The method of claim 18 further comprising, for data chunks of a respective network packet having a read order, that arrive at the transmit buffer out of the read order:
  reordering the data chunks of the respective network packet prior to transmission from the transmit buffer; and
  transmitting the reordered data chunks of the respective network packet from the transmit buffer in the read order.

20. The method of claim 19 wherein:
  the data chunks of the respective network packet are tagged with respective indications of ordinal position within the respective network packet; and
  the reordering comprises storing the tagged data chunks of the respective network packet, according to the respective indications of ordinal position within the respective network packet, in a respective set of ordered locations in the transmit buffer.

21. A method of operating a network device coupled to a communications network, the method comprising:
  receiving at a packet buffer of the network device a stream of read requests to read data of a network packet from the packet buffer of the network device, the read requests including a first read request to read a first data chunk of the network packet and a plurality of subsequent read requests to read additional data chunks of the network packet, each of the first request and the plurality of subsequent read requests causing a respective data chunk to be communicated from the packet buffer to a transmit buffer;
  after elapsing of an amount of time, from receipt of the first read request for the first data chunk of the network packet, equal to a maximum read latency indicative of an amount of time required, following one of the first read request or any one of the subsequent read requests, to return a data chunk from the packet buffer, transmitting the first data chunk of the network packet from the transmit buffer without regard to satisfaction of a fill level threshold by a number of one or more data chunks that are present in the transmit buffer; and
  transmitting subsequent data chunks of the network packet at multiples of a predetermined time interval, defining a desired data rate, following commencement of the transmitting of the first data chunk of the network packet.

22. The method of claim 21 wherein:
  the transmitting the first data chunk of the network packet from the transmit buffer without regard to the satisfaction of the fill level threshold by the number of one or more data chunks that are present in the transmit buffer comprises:
  monitoring an amount of time that has elapsed from receipt of the first read request for the first data chunk of the network packet, and
  when the amount of time that has elapsed from receipt of the first read request for the first data chunk of the network packet equals the maximum read latency, transmitting the first data chunk of the network packet from the transmit buffer.

23. The method of claim 22 wherein the monitoring the amount of time that has elapsed from receipt of the first read request for a first data chunk of the network packet comprises:
  providing a delay line having a delay equal to the maximum read latency;
  injecting a signal into the delay line upon the receipt of the first read request for a first data chunk of the network packet;
  monitoring an output of the delay line for the signal;
  incrementing a counter from '0' to a non-zero value upon detection of the signal at the output of the delay line; and
  checking whether the counter contains a non-zero value.

24. The method of claim 21 further comprising, for data chunks of the network packet having a read order, that arrive at the transmit buffer out of the read order:
  reordering the data chunks of the network packet prior to transmission from the transmit buffer; and
  transmitting the reordered data chunks of the network packet from the transmit buffer in the read order.

* * * * *